(12) United States Patent
Cho et al.

(10) Patent No.: US 6,616,841 B2
(45) Date of Patent: Sep. 9, 2003

(54) HOLLOW FIBER MEMBRANE CONTACTOR

(75) Inventors: Kwantai Cho, Charlotte, NC (US);
Clifton J. Delozier, Fort Mill, SC (US);
Linus I. Holstein, Pineville, NC (US);
R. Allen Pittman, Charlotte, NC (US);
Charles J. Runkle, Charlotte, NC (US); Amitava Sengupta, Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/886,653

(22) Filed: Jun. 21, 2001

(65) Prior Publication Data

US 2002/0195385 A1 Dec. 26, 2002

(51) Int. Cl.$^7$ .............................. B01D 63/00; C02F 1/44
(52) U.S. Cl. .............................. 210/321.83; 210/321.74; 210/321.79; 210/500.23; 210/321.89; 210/321.8; 210/321.88
(58) Field of Search .............................. 210/645, 312.8, 210/321.89, 500.23, 321.79, 649–654, 321.24, 321.83; 264/176, 122; 428/398; 95/45, 46

(56) References Cited

U.S. PATENT DOCUMENTS

| 3,228,877 A | 1/1966 | Mahon |
| 3,755,034 A | 8/1973 | Mahon et al. |
| 4,220,535 A | 9/1980 | Leonard |
| 4,664,681 A | 5/1987 | Anazawa et al. |
| 4,911,846 A | 3/1990 | Akasu et al. |
| 4,940,617 A | 7/1990 | Baurmeister |
| 5,186,832 A | 2/1993 | Mancusi et al. |
| 5,264,171 A | 11/1993 | Prasad et al. |
| 5,284,584 A | 2/1994 | Huang et al. |
| 5,449,457 A | 9/1995 | Prasad |

FOREIGN PATENT DOCUMENTS

| JP | 2-102714 | 4/1990 |

*Primary Examiner*—Joseph Drodge
*Assistant Examiner*—Kwantai Cho
(74) *Attorney, Agent, or Firm*—Robert H. Hammer, III P.C.

(57) ABSTRACT

The present invention is directed to a contactor for degrassing a liquid. The contractor includes a perforated core and a microporous membrane fabric wrapped around the core. The fabric includes a polymethyl pentene hollow fiber as a weft fiber and a warp yarn. A tube sheet secures the ends of the wound fiber and a shell encases the tube sheet and fabric. The shell has at least one opening to permit fluid flow through the shell and an end cap. In a further embodiment the invention is directed to a contactor for degrassing a liquid wherein the contactor is adapted to withstand pressures greater than 0.4 MPa and temperatures greater than 50° C.

20 Claims, 3 Drawing Sheets

HOLLOW FIBER MEMBRANE CONTACTOR

FIELD OF THE INVENTION

This invention is directed to a hollow fiber membrane contactor.

BACKGROUND OF THE INVENTION

Hollow fiber membrane contactors are known. For example, see U.S. Pat. Nos. 3,288,877; 3,755,034; 4,220,535; 4,664,681; 4,940,617; 5,186,832; 5,264,171; 5,284,584; and 5,449,457, each is incorporated herein by reference. In general, such contactors utilize a thin walled membrane to separate, via diffusion, gaseous, solid or liquid components from a solution or colloidal mixture. Hollow fiber membrane diffusion contactors are commercially available under the name of LIQUI-CEL® from Celgard, Inc. of Charlotte, N.C. and under the name of SEPAREL® from Dianippon Ink and Chemicals of Tokyo, Japan (DIC). Such contactors have numerous uses, one being the degassing of fluids.

The SEPAREL® contactor comprises a shell surrounding a hollow fiber fabric that is wound around a perforated core. The SEPAREL® contactor uses a fabric made of polymethyl pentene (PMP) hollow fibers and polyester yarn. Hollow fibers made from PMP exhibits unique diffusion properties. See Japanese Kokai 2-102714 (published Apr. 16, 1990). Additionally, the SEPAREL® contactor operating parameters are limited to a maximum temperature of 50° C. and a maximum feed water pressure of 0.4 Mpa. See, Hollow Fiber Membrane Degassing Module—SEPAREL®, www.d-ic.co.jp.

Commercial PMP fabrics used in the manufacture of contactors utilize the PMP hollow fibers as the fill or weft and polyester yarns as the warp yarn. This fabric has a tendency to break if the fabric is wound under tension. One possible explanation for this weakness is the use of polyester warp yarn in the production of the fabric. Polyester is a relatively stiff material that does not bend and flex well. When a PMP fabric is wound around a mandrel the warp yarns absorb most of the applied load, thus fabrics using polyester warp yarns break and tear. Fabrics similar to those described in Japanese Kokai 2-102714 have been shown to break at essentially zero tension during winding. Some degree of winding tension is desirable to create a well-formed fiber bundle that fits properly within a contactor shell.

Another possible explanation for the tearing exhibited by such PMP fabrics is a failure to utilize properly spaced or sized warp yarn. For example, fabrics similar to those described in Japanese Kokai 2-102714 (which tear during winding) exhibit a maximum warp yarn count of approximately 5 lines (yarns) per inch. See JP 2-102714, Embodiment 3.

U.S. Pat. No. 4,911,846 discloses an artificial lung made with a hollow fiber cord fabric. Note, U.S. Pat. No. 4,911,846, FIGS. 11 and 12. The cord fabric comprises polyolefin hollow fibers (including PMP hollow fibers), as weft fibers and warp fibers (including polyesters, polyamides, polyimides, polyacrylonitriles, polypropylenes, polyarylates, polyvinyl alcohols, etc.). The warp yarns are preferably multifilament yarns of polyesters or polyamides having a yarn fineness of 10 to 150 deniers, more preferably 25 to 75 deniers. See U.S. Pat. No. 4,911,846 col. 6, lines 3–14. No information is provided regarding the spacing of the warp yarn or the makeup of non-polyester, non-polyamide warp yarns.

Accordingly, a need exists for an improved contactor preferably employing a fabric that is not susceptible to breakage and operable at higher temperatures and pressures than known PMP hollow fiber contactors.

SUMMARY OF THE INVENTION

The present invention is directed to a contactor for degassing a liquid comprising a perforated core and a microporous membrane fabric wrapped around the core. The fabric comprises a polymethyl pentene hollow fiber, as a weft fiber, and a polyolefin warp yarn. In preferred embodiments the fabric has a weft fiber count between 50 and 70 fibers per inch and a warp yarn count between 3 and 12 yarns per inch. A tube sheet secures the ends of the wound fabric and a shell encases the tube sheet and wound fabric. The shell has at least one opening to permit liquid flow through the shell and an end cap.

In a further embodiment, the invention is directed to a contactor for degassing a liquid wherein the contactor is adapted to withstand pressures greater than 0.4 MPa and temperatures greater than 50° C. The contactor according to this embodiment further comprises a shell and a microporous membrane fabric comprising a polymethyl pentene hollow fiber, as a weft fiber, and a warp yarn with fiber and yarn counts similar to those mentioned above. The fabric is preferably wrapped around a perforated core and situated inside the shell. The shell has at least one opening to permit the liquid flow through the shell.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
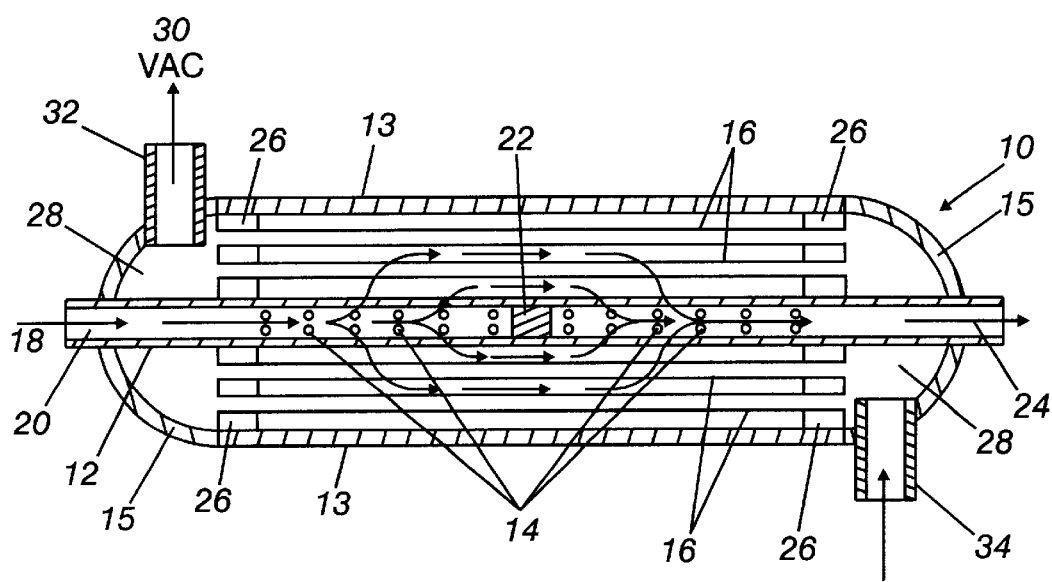
FIG. 1 is a schematic illustration of a hollow fiber membrane contactor.

Referring to the drawings wherein like numerals indicate like elements, there is shown in FIG. 1 an embodiment of a hollow fiber membrane contactor 10 according to the invention. The contactor 10 includes a core tube 12. The core tube 12 has a plurality of perforations 14. Hollow fibers 16 surround the core tube 12. A shell 13 surrounds the fibers and the core tube 12. Tube sheets 26 secure the lateral ends of fibers 16 to tube 12. The lateral ends of shell 13 are closed with end caps 15.

Referring to FIG. 1, a liquid 18 preferably enters the contactor 10 via a liquid inlet 20 of the core tube 12. The liquid 18 travels through the inlet 20 of the core tube 12 and exits the core tube 12 via perforations 14 when a block 22 diverts the liquid. The liquid 18 then travels over the exterior surfaces of the hollow fibers 16. The liquid 18 re-enters the core tube 12 via perforations 14 on the other side of the block 22 and exits the core tube 12 via a liquid outlet 24. The hollow fibers 16 surround the core tube 12 and are maintained generally parallel to core tube's 12 axis via tube sheets 26. The hollow fibers 16 extend through the tube sheet 26 and are in communication with headspaces 28 on either end of contactor 10, so that a vacuum 30 drawn at ports 32 and 34 is in communication with the lumen side of hollow fibers 16 via headspaces 28. Port 34, for example, may also be used to introduce a sweep gas, which facilitates entrained gas removal.

The membrane contactor 10 is preferably an external flow, hollow fiber membrane module. The membrane contactor 10 has a lumen side and a shell side. The lumen side, also known as the internal side, is defined, in large part, by the lumen of the hollow fiber. The shell side, also known as the external side, is defined, in part, by the external surface of the hollow fiber. The liquid travels through the shell (or external) side, while the vacuum (or vacuum and sweep gas) is applied to the lumen (or internal) side. Thereby, entrained gases from the liquid pass, via diffusion, from the shell side through the membrane to the lumen side.

Preferably, the hollow fibers 16 are semi-permeable, gas selective, heterogeneous, integrally asymmetric, and liquid impermeable membranes. The membrane is, preferably, a single layer membrane (e.g., not a composite or multi-layered membrane) and is made from a homopolymer of PMP. The membrane is, preferably, a skinned membrane and the skin is on the shell side. The membrane has a permeability of less than 100 Barrers ($10^{-8}$ standard $cm^3.cm/sec.cm^2.cm$ (Hg)). For example, see U.S. Pat. No. 4,664,681, incorporated herein by reference. The total membrane in the contactor preferably has an active surface area greater than 0.05 $m^2$ and most preferably between 0.1 $m^2$ to 350 $m^2$.

Figure 2:
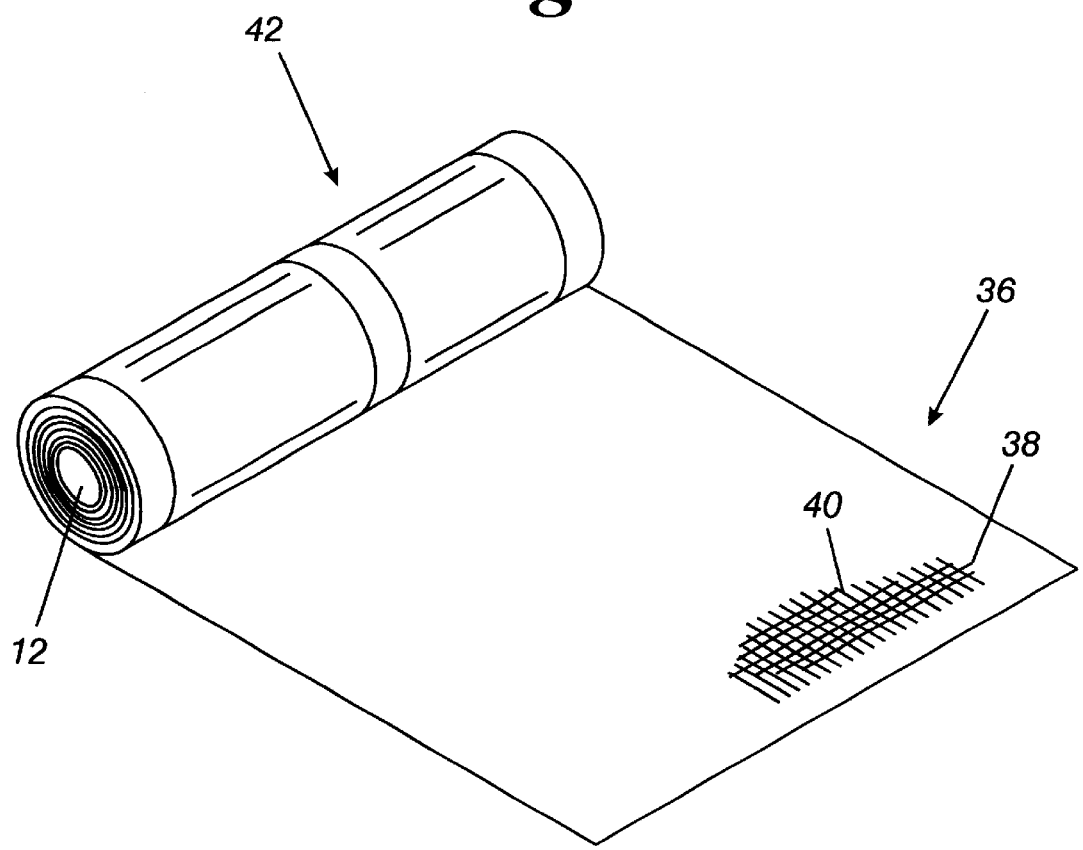
FIG. 2 is an illustration of the fabric according to the invention.

Referring now to FIG. 2, the hollow fibers 16 are preferably made into a fabric 36 having a fill or weft yarn 38 and a warp yarn 40. Preferably the fabric is a weft insertion knitted fabric where the warp yarn is the knitting yarn. The weft yarn 38 is the hollow fiber 16. The fabric 36 preferably has a weft fiber count between 50 and 70 fibers per inch and most preferably between 60 and 65 fibers per inch.

The warp yarn 40 should be flexible, yet strong, and inert to the liquid flowing through the contactor. The warp yarns 40 are preferably multifilament polyolefin yarns. Most preferably the yarns are selected from the group consisting of polypropylene and polyethylene. Those skilled in the art recognize that the term filament is sometimes used synonymously with cut filament which is also called staple fiber. Accordingly, as used herein the term yarn should be interpreted to include yarns made from filament and staple fiber. Preferably, the yarn possesses a fineness sufficient to resist tearing but not too large as to cause noticeable gaps between fabric layers. Preferably the warp yarn should be between 80 denier/40 filament (i.e., a 80/40 yarn) and 20 denier/10 filament (a 20/10 yarn), most preferably around 40 denier/20 filament (a 40/20 yarn). Optionally, the warp yarn may include a surface finish, e.g. a silicon oil surface finish.

The count of the warp yarn is also an important factor in the design of the fabric. Too few warp yarns and the fabric will be susceptible to tearing. Too many will diminish the efficiency of the contactor by blocking surface area of the hollow fibers. In preferred embodiments the warp yarn count is between about 3 and 12 yarns per inch of fabric; most preferably around 6 to 7 yarns per inch.

When wound, the fabric 36 and the core tube 12 form a hollow membrane unit 42. Unit 42 is preferably cylindrical. In use, it is expected that the unit 42 will have a diameter ranging between about 2 in. and 16 in. and a length ranging between about 8 in. and 72 in. Larger sizes are possible. The aspect ratio of the unit 42 is defined as L/D² where L is the nominal length of the unit and D is the nominal diameter of the unit. Preferably, the aspect ratio will range between 0.1 to 6.0 in.$^{-1}$.

Furthermore, the fabric 36 is preferably wound under tension to create a unit 42 having a packing fraction of between about 35% to 45%. Packing fraction (PF) is defined as the number of fibers (n) multiplied by the cross-sectional area of each fiber ($A_f$) divided by the cross-sectional area of the fiber bundle ($A_b$) where the cross-sectional area of the fiber bundle excludes the area occupied by the core tube 12. Stated symbolically, $$PF = \frac{n * A_f}{A_b}$$

Additionally, PMP hollow fibers have a natural tendency to shrink which increases with temperature. Accordingly, in preferred embodiments of the invention, the PMP fabric 36 is preshrunk prior to winding. A preferred method of pre-shrinking and stabilizing the fabric is to heat the fabric to about 15° C. above the expected operating temperature for approximately 2 to 8 hours, preferably 4 hours. Heating the fabric between about 55° C. and about 65° C. for about 2 to 8 hours, preferably 4 hours, should provide adequate fiber stabilization for most anticipated applications. Preshrinking the fabric and winding the fabric under tension aids in achieving a well-formed bundle that contributes to the higher operating parameters (e.g., temperature and pressure) achieved by the invention.

Hollow fiber membrane units 42 formed according to the invention may be combined with other structural elements to create a contactor. Such structural elements are well known in the art and generally consist of an outer shell with at least one opening in the shell to permit fluid flow through the shell. Commonly assigned U.S. patent application Ser. No. 09/816,730, filed Mar. 22, 2001, incorporated herein by reference, discloses several possible structures for contactors, all of which are applicable to the present invention.

Figure 3:
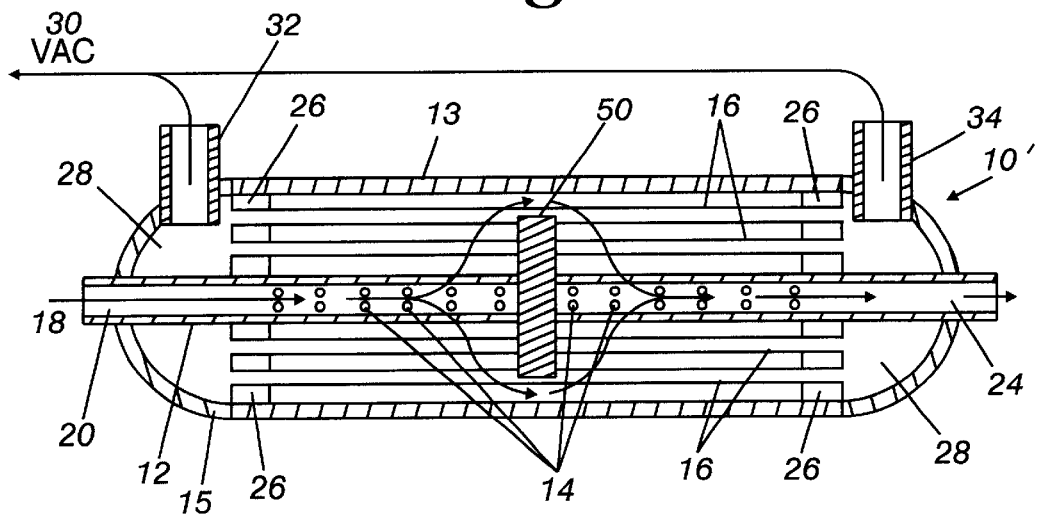
FIG. 3 is a schematic illustration of a second embodiment of the membrane contactor.

Referring to FIG. 3, contactor 10' is the same as shown in FIG. 2 but for a flow diverting baffle 50 located within the shell side, and port 34 has been moved. The baffle 50 is added to promote distribution of liquid over all exterior surfaces of the hollow fibers 16. Port 34 is moved to illustrate the non-criticality of port location.

Figure 4:
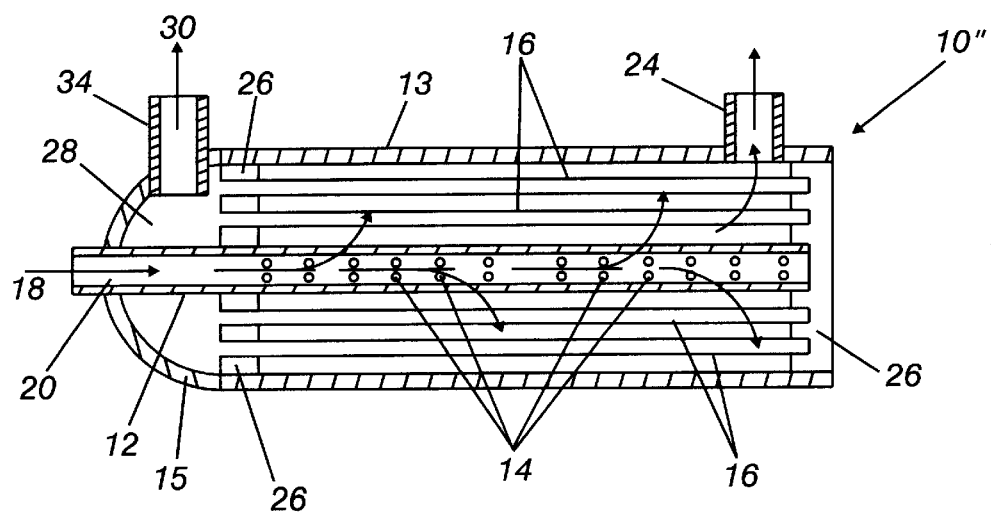
FIG. 4 is a schematic illustration of a third embodiment of the membrane contactor.

Referring to FIG. 4, contactor 10" differs from contactors 10 and 10' by moving liquid outlet 24 from the terminal end of core tube 12 to the contactor shell, as illustrated. Vacuum 30 is in communication with headspace 28 which, in turn, is in communication with the lumens of hollow fibers 16. The second headspace illustrated in the previous embodiments has been eliminated. Liquid 18 enters the liquid inlet 20 of the core tube 12. Liquid 18 exits the tube 12 via perforations 14, travels over the exterior surfaces of the hollow fibers 16, and exits the shell side via an outlet 24. The outlet designated 24 may be placed at other locations on the exterior of the contactor so that it maintains communication with the shell side.

The contactor according to the invention may be formed using any of the methods known by those skilled in the art. One such method is set forth in commonly assigned U.S. patent application Ser. No. 09/851,242, filed May 8, 2001.

The present invention may be embodied in other specific forms without departing from the spirit or essential attributes thereof, and, accordingly, reference should be made to the appended claims, rather than to the foregoing specification, as indicating the scope of the invention.

What is claimed is:

1. A contactor for degassing a liquid comprising:

a perforated core;

a pre-shrunk microporous membrane fabric wrapped around said core, wherein said fabric is pre-shrunk by heat at about 15° C. above the operating temperature for 2–8 hrs for the fabric stabilization, said fabric comprising a polymethyl pentene hollow fiber weft and a polyolefin warp yarn wherein the weft count is between 50 and 70 fibers per inch, the warp count is between 3 and 12 yarns per inch, and the warp yarn is finer than an 80 denier 40 filament yarn;

a tube sheet securing the ends of said fiber;

a shell encasing said tube sheet and fabric;

at least one opening in said shell to permit fluid flow through said shell; and an end cap affixed to the shell.

2. A contactor according to claim 1 wherein said polyolefin in yarn is a 40 denier/20 filament polypropylene yarn.

3. A contactor according to claim 1 wherein said fabric is pre-shrunk by heating said fabric to a temperature between about 55° C. and 65° C. for about 2 to 8 hours.

4. A contactor according to claim 1 wherein said polymethyl pentene hollow fiber is a skinned fiber.

5. A contactor according to claim 1 wherein said weft fiber count is between 60 and 65 fibers per inch.

6. A contactor according to claim 1 wherein the aspect ratio of said fabric is between 0.10 to 6.0 inches$^{-1}$.

7. A contactor according to claim 1 wherein a liquid passes through the shell side of the contactor.

8. A contactor according to claim 1 wherein said polymethyl pentene hollow fiber fabric equates to an active membrane area greater than 0.05 m$^2$.

9. A contactor according to claim 1 wherein the packing fraction of the wound fabric is between about 35% and 45%.

10. A contactor according to claim 1 wherein the said warp fiber count is between 6 and 7 fibers per inch.

11. A contactor for degassing a liquid:

wherein said contactor is adapted to withstand pressures greater than 0.4 MPa and temperatures greater than 50° C. and further comprises;

a shell;

a pre-shrunk microporous membrane fabric comprising a polymethyl pentene hollow fiber weft and a warp yarn wherein said weft count is between 50 and 70 fibers per inch and said warp count is between 3 and 12 yarns per inch, wherein said fabric is pre-shrunk by heat at about 15° C. above the operating temperature for 2–8 hrs for the fabric stabilization; and at least one opening in said shell to permit the fluid flow through said shell.

12. A contactor according to claim 11 wherein said warp yarn is a polyolefin yarn finer than an 80 denier 40 filament yarn.

13. A contactor according to claim 12 wherein said polyolefin yarn is a 40 denier/20 filament polypropylene yarn.

14. A contactor according to claim 11 wherein said polymethyl pentene hollow fiber is a skinned fiber.

15. A contactor according to claim 11 wherein said fabric has a weft fiber count of between 60 and 65 fibers per inch.

16. A contactor according to claim 11 wherein the aspect ratio of said fabric is between 0.10 to 6.0 inches$^{-1}$.

17. A contactor according to claim 11 wherein a liquid passes through the shell side of the contactor.

18. A contactor according to claim 11 wherein said polymethyl pentene hollow fiber fabric equates to an active membrane area greater than 0.05 m$^2$.

19. A contactor according to claim 11 wherein packing fraction of the wound fabric is between about 35% and 45%.

20. A contactor according to claim 11 wherein said warp yarn count is between 6 and 7 yarns per inch.

* * * * *

UNITED STATES PATENT AND TRADEMARK OFFICE
CERTIFICATE OF CORRECTION

PATENT NO.    : 6,616,841 B2
DATED         : September 9, 2003
INVENTOR(S)   : Kwantai Cho et al.

It is certified that error appears in the above-identified patent and that said Letters Patent is hereby corrected as shown below:

<u>Title page,</u>
Item [57], ABSTRACT, replace "degrassing" with -- degassing --.

Signed and Sealed this

Twenty-first Day of October, 2003

JAMES E. ROGAN
*Director of the United States Patent and Trademark Office*